US008495612B2

(12) United States Patent
Bertrand et al.

(10) Patent No.: US 8,495,612 B2
(45) Date of Patent: Jul. 23, 2013

(54) SYSTEMS AND METHODS FOR UPGRADING A VERSION OF SOFTWARE

(75) Inventors: Stephen Christopher Bertrand, Lexington, MA (US); Sally Ann Hehir, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/278,784

(22) Filed: Oct. 21, 2011

(65) Prior Publication Data

US 2013/0104115 A1  Apr. 25, 2013

(51) Int. Cl.
*G06F 9/44* (2006.01)
(52) U.S. Cl.
USPC .......................................... 717/170; 717/101
(58) Field of Classification Search
USPC ................................................... 717/168–178
See application file for complete search history.

(56) References Cited

U.S. PATENT DOCUMENTS

| | | | | |
|---|---|---|---|---|
| 6,367,077 B1 * | 4/2002 | Brodersen et al. | | 717/170 |
| 7,222,338 B2 * | 5/2007 | Bae | | 717/168 |
| 7,305,629 B2 * | 12/2007 | Barsness et al. | | 715/788 |
| 7,536,684 B2 * | 5/2009 | Patrizio et al. | | 717/170 |
| 7,636,172 B2 * | 12/2009 | Akiyoshi et al. | | 358/1.13 |
| 7,721,276 B2 * | 5/2010 | Lwo | | 717/166 |
| 7,761,865 B2 * | 7/2010 | Stienhans et al. | | 717/170 |
| 2006/0190579 A1 * | 8/2006 | Rachniowski et al. | | 709/223 |
| 2009/0307650 A1 * | 12/2009 | Saraf et al. | | 717/101 |
| 2010/0169875 A1 * | 7/2010 | Stewart | | 717/170 |
| 2010/0235823 A1 * | 9/2010 | Garbers et al. | | 717/170 |
| 2011/0078674 A1 * | 3/2011 | Ershov | | 717/170 |
| 2012/0079471 A1 * | 3/2012 | Vidal et al. | | 717/169 |

OTHER PUBLICATIONS

Hoan Anh Nguyen et al; "A Graph-based Approach to API Usage Adaptation", OOPSLA/SPLASH'10, Oct. 17-21, 2010; 20 pages.

* cited by examiner

*Primary Examiner* — Don Wong
*Assistant Examiner* — Mohammad Kabir
(74) *Attorney, Agent, or Firm* — Guerin & Rodriguez, LLP

(57) ABSTRACT

Described are systems and methods for upgrading a software program between sequential or non-sequential versions. An interface definition file of a first version of the software program is stored. The software program is upgraded from the first version to a second version. The second version of the software program is stored in the memory. A determination is made regarding the availability of a difference tool. The difference tool determines according to a static comparison one or more differences between the interface definition file of the first version and an interface definition file of the second version, and generates a results file that displays the determined differences.

19 Claims, 3 Drawing Sheets

SYSTEMS AND METHODS FOR UPGRADING A VERSION OF SOFTWARE

FIELD OF THE INVENTION

The present invention relates generally to software version upgrades, and more specifically, to the identification and automatic generation of differences between non-sequential software version upgrades.

BACKGROUND

Software upgrades generally refer to the replacement of a current version of a software product with a newer version, and are typically performed to add new features to the software product or to correct problems or remove bugs with the current version.

When a user upgrades a software product to a newer version, existing scripts and programmatic customizations are often modified to conform to changes in a command-line interfaces (CLI) or application programming interface (API) of the software product. For example, consulting release notes are often used, where a user reads through the release notes to identify those changes made since the last release. The user can then apply those changes to an existing script. If an upgrade spans multiple releases, referred to as a non-sequential upgrade, information is compiled from several different sets of release notes.

BRIEF SUMMARY

In one aspect, provided is a computer-implemented method of upgrading a software program from a first version thereof to a second version. The method comprises storing at least one interface definition file of a first version of a software program in a memory; upgrading the software program from the first version to a second version, wherein upgrading the software program includes installing the second version of the software program in the memory; and determining an availability of a difference tool. In response to a determination of the availability of the difference tool, the method further comprises: determining from the difference tool according to a static comparison one or more differences between the at least one interface definition file of the first version and at least one interface definition file of the second version; and generating a results file that displays the determined differences.

In another aspect, provided is a system that generates a set of differences between software versions in response to an upgrade. The system comprises a storage repository that stores at least one interface definition file of a first version of a software program, the software program related to an interface definition file; an installer module that upgrades the software program from the first version to a second version, and installs the second version of the software program in the memory; and a difference tool that determines according to a static comparison one or more differences between the at least one interface definition file of the first version of the software program and at least one interface definition file of the second version of the software program, and generates a results file that displays the determined differences.

In another aspect, provided is a computer program product for upgrading a software program from a first version thereof to a second version. The computer program product comprises a computer readable storage medium having computer readable program code embodied therewith. The computer readable program code comprises computer readable program code configured to store at least one interface definition file of a first version of a software program in a memory; computer readable program code configured to upgrade the software program from the first version to a second version, wherein upgrading the software program includes installing the second version of the software program in the memory; computer readable program code configured to determine an availability of a difference tool, computer readable program code configured to, in response to a determination of an availability of a difference tool, determine from the difference tool according to a static comparison one or more differences between the at least one interface definition file of the first version and at least one interface definition file of the second version; and computer readable program code configured to generate a results file that displays the determined differences.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
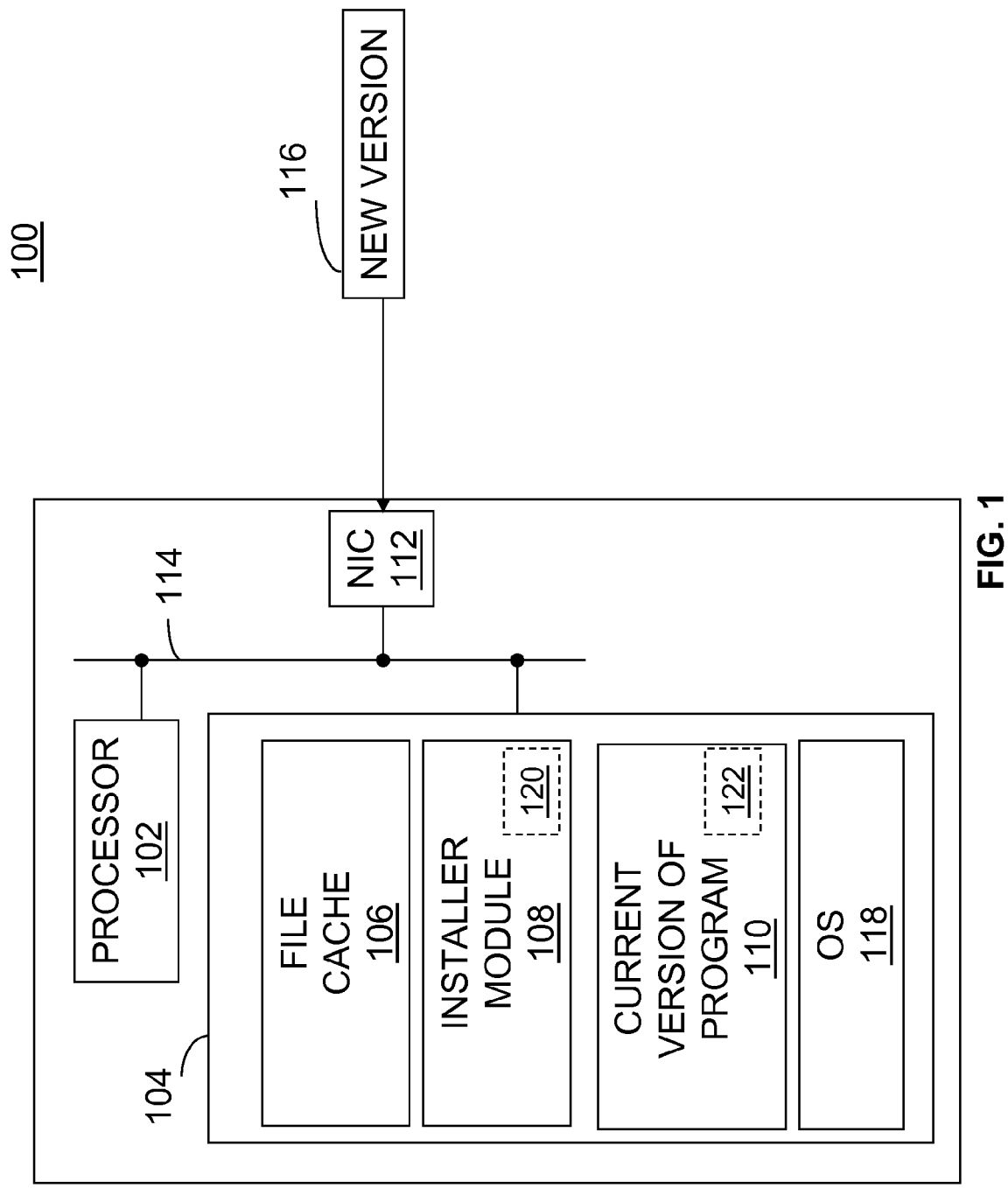
FIG. 1 is a block diagram of computer platform that generates a set of differences between software versions in response to an upgrade, in accordance with an embodiment.

In the following description, specific details are set forth although it should be appreciated by one of ordinary skill that the systems and methods can be practiced without at least some of the details. In some instances, known features or processes are not described in detail so as not to obscure the present invention.

Conventional approaches such as the use of consulting release notes requires manual effort. Accordingly, the process of identifying a set of changes between releases requires a time-consuming manual modification step.

Software version upgrades, for example, enterprise application software (EAS) upgrades, can be particularly expensive and disruptive. Although many organizations evaluate successive software versions, they tend to upgrade only those versions of software providing benefits that greatly outweigh the inconvenience and expense of the upgrade process. In doing so, any intermediate software versions between a currently installed software version and a target version may not be installed. Consequently, many upgrades are non-sequential with respect to released versions, making it necessary to compile information from several sets of release notes, which can be a time-consuming and error-prone process. In addition, the information in release notes is not derived directly from source code and may therefore be an unreliable approach for revising scripts and other software programs.

To optimize the process of maintaining automation across non-sequential upgrades, information about UI-related files, for example, CLI or API changes, must be both reliable and readily available. To be deemed reliable, change information can be derived directly from CLI and API definition files rather than from manual transcriptions from such files. To be available or otherwise readily consumable, change information must show the differences between arbitrary product versions in an easy-to-use format.

Tools are readily available that can derive a set of CLI or API changes directly from UI definitions. However, these tools are limited to the changes in successive software versions and are ineffective with regard to non-sequential upgrades. Further, many existing solutions rely on metadata, which may require manual maintenance, and therefore prone to error.

In brief overview, a system and method provide an approach using a static analysis for automatically generating a set of changes between different successive or non-successive software product versions during an upgrade. In an installation, the system and method can automate finding differences in CLI and API definition files between an installed release and a newer release of that software product that is to be installed. Accordingly, in cases where differences are statically identified between non-successive versions, a comprehensive set of differences between arbitrary software versions can be produced instead of several sets of differences, each set corresponding to two successive software versions.

In an embodiment, the system and method identify changes between different software product releases without relying on metadata that serves as a flag for such changes, and without requiring a manual file modification step. The inventive concepts can yield a reliable and comprehensive list of changes that is specific to current and target software configurations at an enterprise site, thereby conveniently enabling script and application developers to work with the changes that are generated, which can be applied to scripts, configuration files, or other programs with confidence, i.e., less prone to error, and with a minimum investment of time.

The system includes an installer that, at a software product upgrade time, caches certain user interface (UI) files, including but not limited to message files, command synopsis definition files, API definition files, or related source files, to prevent the files from being overwritten during an upgrade. The software product or installer can provide a difference tool, which compares each cached file with its newly installed counterpart, writes the differences to a file, and displays the path to that file, thereby enabling the user to examine the differences. In an embodiment, the software product or installer module 108 doesn't provide such a tool; rather, the paths to the cached and newly installed files are displayed. A user can later invoke a difference tool against those files, for example, using a system utility product.

FIG. 1 is a block diagram of computer platform 100 that generates a set of differences between software versions in response to an upgrade, in accordance with an embodiment. In particular, the computer platform 100 can automatically identify differences between two files, for example, in CLI and API definition files, where one file corresponds to installed software release and the other file corresponds to a newer release of that software to be installed. In particular, comparisons can be made between linearly evolving versions of the same APIs and CLIs.

The computer system 100 includes a processor 102, a memory 104, and a network interface controller (NIC) 112, which can communicate with each other via a bus 114 and/or data connector, for example, a peripheral component interconnect (PCI) bus. The computer system 100 can include an application server or related server used in a development environment.

The NIC 112 can include one or more adaptors for communicating with a network (not shown) such as a WAN, LAN, Internet, public network, private network, and the like, or via a direct connection.

The memory 104 can include volatile memory, for example, random access memory (RAM) and the like, and/or non-volatile memory, for example, read-only memory (ROM), flash memory, and the like. The memory 104 can include removable and/or non-removable storage media implemented in accordance with methods and technologies known to those of ordinary skill in the art for storing data. Stored in the memory 104 can include program code, such as program code of an operating system 118 executed by the processor 102. The memory 104 includes a file cache 106 for storing a current software version, which can include API and/or CLI definition files and the like. The memory 104 can also include an installer module 108 and an installed software program 110 to be upgraded to a new version of software 116, also referred to as a target version.

The installer module 108 performs a sequential or non-sequential upgrade of a current version of software in the data storage 106 in response to receiving the new version of software 116. The installed software version 110 and the new version 116 can include program code. The installer module 108 can include a cache (not shown) for storing certain user interface (UI) files, for example, message files, command synopsis definition files, API definition files and the like, to prevent these files from being overwritten during the software upgrade.

In an embodiment, the installer module 108 includes a difference tool 120. The difference tool 120 compares some or all of a cached file, for example, an interface definition file, with its newly installed counterpart of the new software 116, and generates a set of differences, which can be written to a file and stored in the data storage 106. The file can be a text-based file for creating upgrade scripts and the like. The comparison can be performed by a string compare utility or related tool at install time. The difference tool 122 can generate a path to the file. The generated path can be displayed, for example, via a user interface (not shown), permitting a user to examine the differences. The comparison can be a line-by-line, or string, comparison between the current version 110 of an interface, e.g. a CLI or API, and its new version 116. As a static comparison is made, no dynamic analysis or algorithm driven comparison is required. In performing a string comparison, the inventive concepts can be used by a variety of applications independent of the source in which the application programs are written. The output from the comparison can be used to assess the amount of work required to update to a newer version of an application as well as provide guidelines and potential basis for a script to update existing scripts, for example, using the application's CLI. In another embodiment, a difference tool 122 is included in the installed current version 110, which provides features and functions the same or similar to those described with reference to the difference tool 120 of the installer module 108.

In the absence of the difference tool 120, the installer module 108 can be configured to display the paths to each of the cached files and the corresponding newly installed files. Accordingly, regardless of whether a difference tool 120 is applied, changes corresponding to a complete set of CLIs or APIs for the application undergoing an upgrade can be identified and their location displayed to a user. The user can then compare the two directories or individual files using a difference utility of their choice. For example, when the installer module 108 identifies and caches files from the earlier release, the location in which the files were cached can be stored by the installer module 108 and presented as output at the end of installation. Similarly, the installer module 108 can record where the newest version of these files are placed and record the location.

Figure 2:
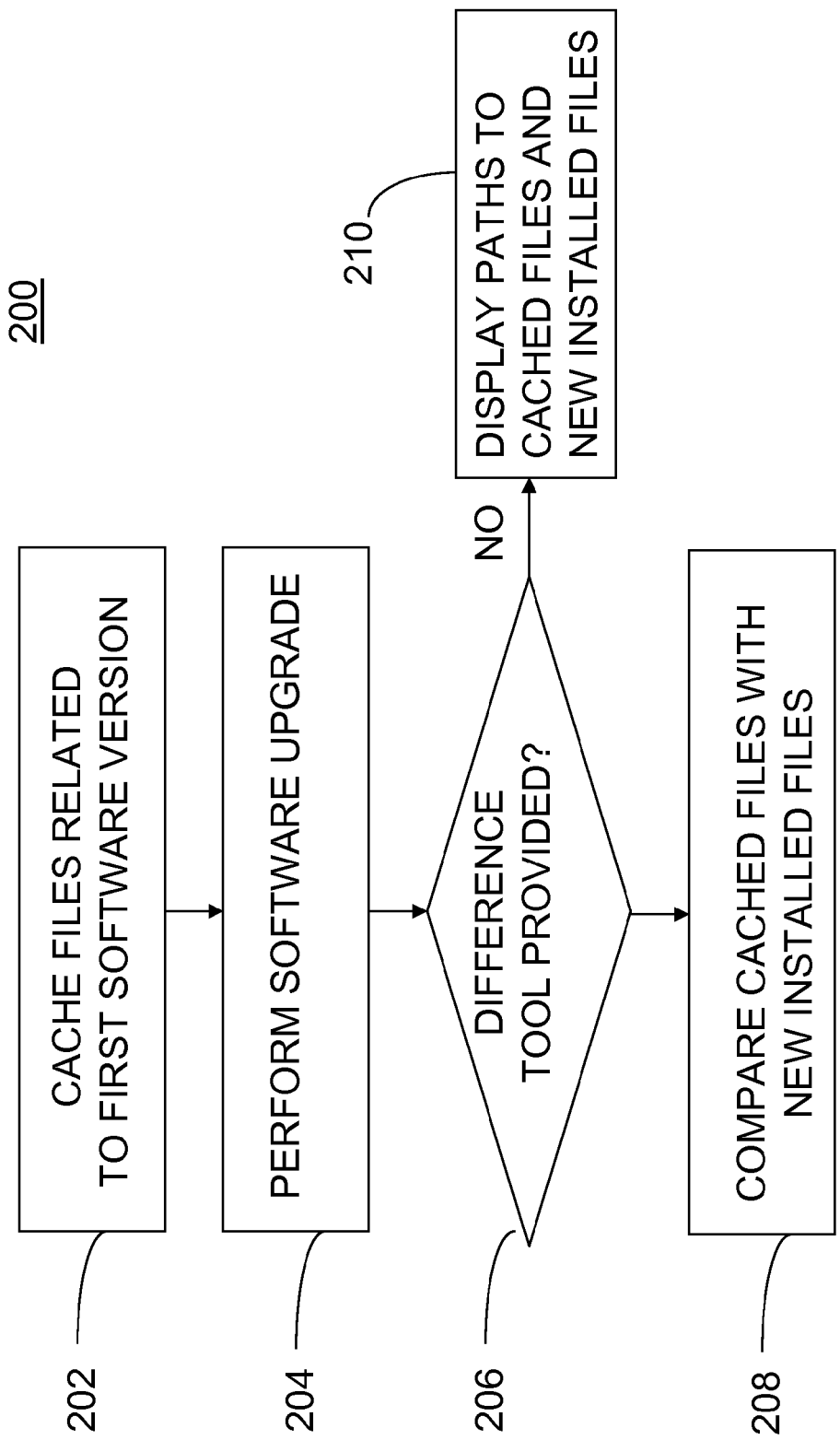
FIG. 2 is a flow diagram of a method for determining differences between software versions, in accordance with an embodiment.

FIG. 2 is a flow diagram of a method 200 for determining differences between software versions, in accordance with an embodiment. In describing the method 200, reference is also made to elements of FIG. 1. Some or all of the method 200 can be governed by instructions that are stored in the memory 104 and can be executed by the processor 102 of the computer system 100.

At block 202, at least one file related to a first software version 110 is cached. The file can be a user interface (UI) file cached by the installer module 108 at the file cache 106. The file can be a message file, a command synopsis definition file, an API definition file, and the like. In this manner, the first version of the file is prevented from being overwritten during the upgrade.

At block 204, a software upgrade is performed by the installer module 108 from the first software version to a second software version. The second software version can be a successive version, that is, there are no intervening versions between the first software version and the second software version. Alternatively, the second software version can be a non-successive version, where there are one or more intermediate versions, or related program code, between the first software version and the second software version.

At decision block 206, a determination is made whether the difference tool 120 is provided. The difference tool 120 can be configured as part of the installer module 108, or can optionally be part of the installed program 110, shown as difference tool 122. When the installer module 108 includes the difference tool 120, a comparison can be performed at install time and a pointer to the pathname for the file or files containing the results can be generated at the end of the installation. When the software product 110 includes the difference tool 122, the program 110 can run an installation tool, for example, at the installer module 108, at the first product startup, and perform the comparison. In order to perform a comparison, the installer module 108 can transfer the location of the cached information to the software program 110 undergoing the comparison.

If a difference tool 120 is provided, then at block 208 the difference tool 120 compares the cached files with the newly installed counterpart files of the second software version. The contents of source files can be compared that exist as part of the product download and do not require a manual file modification step.

The difference tool 120 writes the differences identified from the comparison to a results file, for example, a text-file. The difference tool 120 can display a path to the results file, enabling the user to examine the differences between the CLI files, API files, and the like. A software routine can be written and executed that will display the path to the results file on the command line or through a GUI screen as part of the installation sequence. The path can be displayed in a similar manner by the software product, for example, if the comparison is being performed at the software product. In this manner, a developer or other user can make appropriate updates to scripts and programs with less time, less expense, and less exposure to risk than conventional manual approaches or without the need for error-prone metadata.

If a difference tool 120 or 122 is not provided, then at block 210 the paths to the cached and newly installed files, respectively, are displayed. The user can be provided with a location of the cached files and the newest versions of the files by the installer module 108. The user is provided with an option of invoking a system differences tool against the files, for example, a third party tool, or the user can manually read the files.

The location of the cached files is recorded by the installer module 108 as is the location of the newest version of the files. The location of the newest files can vary depending on the installation path specified by the user. The installer module 108 can record this information. The cached files can be stored in a standard location. A software routine can be written and generated that will return the two pathnames on a command line or through a GUI-based installation screen the end of the installation. It can also be displayed in the same way by the software product if that information is passed to it by the installer module 108.

Figure 3:
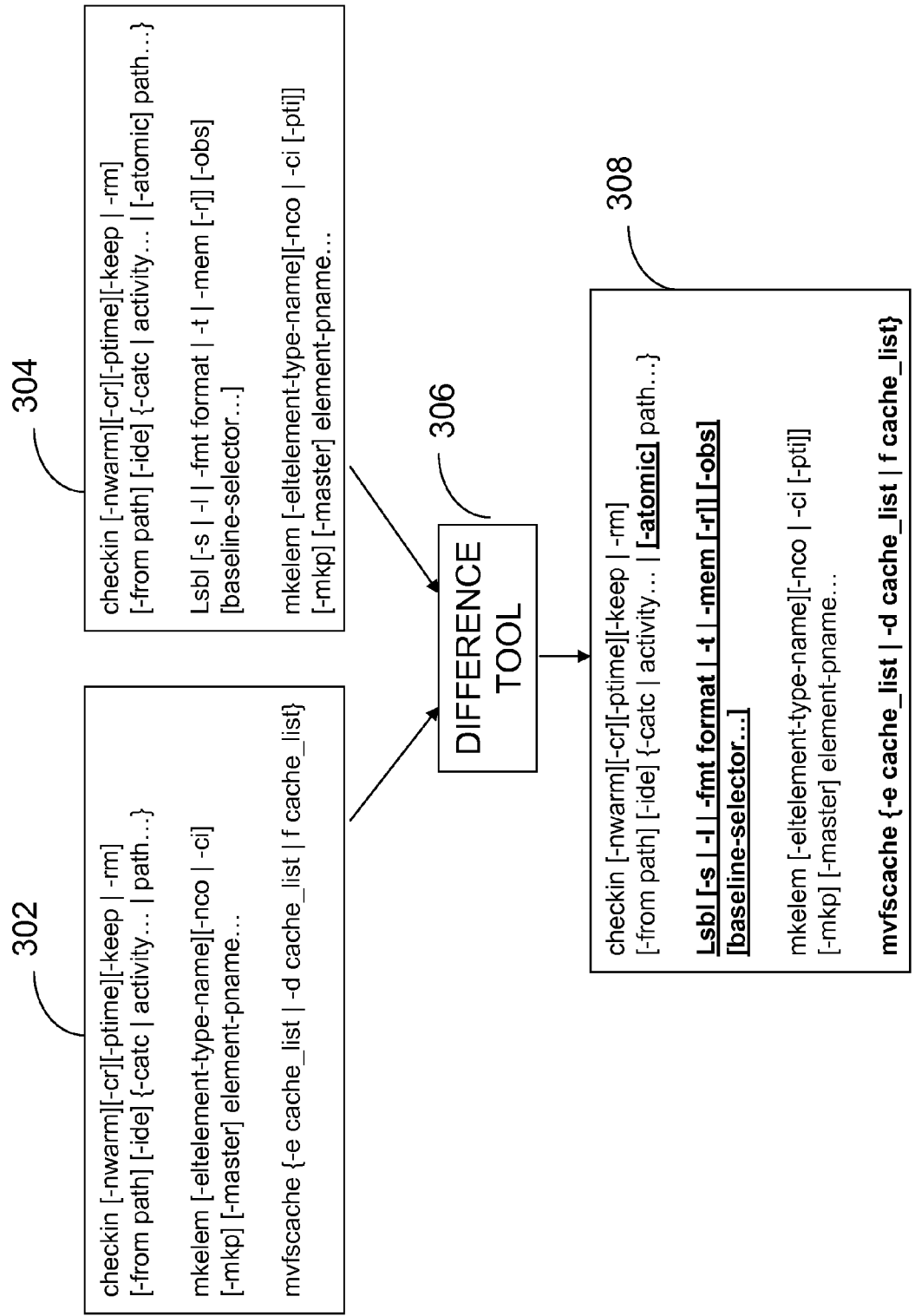
FIG. 3 is a diagram illustrating a difference tool performing a comparison of two message files and further illustrating a results file generated in response to the comparison, in accordance with an embodiment.

FIG. 3 is a diagram illustrating a difference tool 306 performing a comparison of two message files 302, 304 and a results file 308 generated in response to the comparison, in accordance with an embodiment. The difference tool 306 can be similar to the difference tool 120 described with respect to FIG. 1. Details of the difference tool 306 will therefore not be repeated for brevity.

In an embodiment, the message file 302 is a file from a current installation related to an IBM® Rational® ClearCase® developer tool, in particular, software configuration management product. The message file 304 can be a file from a target installation related to an IBM® Rational® ClearCase® developer tool. The ClearCase® developer tool provides a CLI for a software development environment, permitting a user to perform Rational®ClearCase® operations, for example, by entering subcommands such as "checkin" and so on. The difference tool 306 performs a comparison of the message files 302, 304, and generates the results file 308 produced by the comparison. The results file 308 can be displayed so that a user can distinguish additions, deletions, or other changes between the message files 302, 304. For example, the element [-atomic] is identified as being added in the message file 304. The difference tool 306 can also provide a file path to the results file 308.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method of upgrading a software program from a first version thereof to a second version, comprising:
    storing at least one interface definition file of a first version of a software program in a memory;
    upgrading the software program from the first version to a second version, wherein upgrading the software program includes installing the second version of the software program in the memory;
    determining an availability of a difference tool at the software program or at an installer module;
    wherein in response to a determination of the availability of the difference tool, the method further comprises:
    determining from the difference tool according to a static comparison one or more differences between the at least one interface definition file of the first version and at least one interface definition file of the second version; and
    generating a results file that displays the determined differences.

2. The method of claim 1, wherein the software program includes a command line interface (CLI) definition file or an application programming interface (API) definition file.

3. The method of claim 1, wherein the first version and the second version are separated from each other by at least one other version.

4. The method of claim 1, wherein in response to a determination of the availability of the difference tool, the method further comprises:
    providing a path to the results file.

5. The method of claim 1, wherein in response to a determination of the unavailability of the difference tool, the method further comprises:
    providing a first path to the first version; and
    providing a second path to the second version.

6. The method of claim 1, wherein the files being compared are ASCII or other text files.

7. The method of claim 1, further comprising: applying the determined differences to a configuration file or a script.

8. The method of claim 1, wherein the installer module installs the second version of the software program in the memory, and wherein determining from the difference tool one or more differences between the first version and the second version includes comparing contents of source files of the first version and the second version, respectively, by the installer module.

9. The method of claim 1, wherein storing a first version of a software program at a memory comprises caching the first version at an installer cache.

10. A system that generates a set of differences between software versions in response to an upgrade, comprising:
    a storage repository that stores at least one interface definition file of a first version of a software program;
    an installer module that upgrades the software program from the first version to a second version, and installs the second version of the software program in the memory; and
    a difference tool that determines according to a static comparison one or more differences between the at least one interface definition file of the first version of the software program and at least one interface definition file of the second version of the software program, and generates a results file that displays the determined differences.

11. The system of claim 10, wherein the installer module is configured to include the difference tool.

12. The system of claim 10, wherein the software program is configured to include the difference tool.

13. The system of claim 10, wherein the software program includes a command line interface (CLI) definition file or an application programming interface (API) definition file.

14. The system of claim 10, wherein the first version and the second version are separated from each other by at least one other version.

15. The system of claim 10, wherein the installer module provides a path to the results file.

16. The system of claim 10, wherein the installer generates and displays a first path to the first version and a second path to the second version, and wherein the difference tool is invoked against the first version and the second version.

17. The system of claim 10, wherein the files being compared are ASCII or other text files.

18. The system of claim 10, wherein the installer applies the determined differences to a configuration file or a script.

19. A computer program product for upgrading a software program from a first version thereof to a second version, the computer program product comprising:
    a non-transitory computer readable storage medium having computer readable program code;
    embodied therewith, the computer readable program code comprising;
    computer readable program code configured to store at least one interface definition file of a first version of a software program in a memory;
    computer readable program code configured to upgrade the software program from the first version to a second version, wherein upgrading the software program includes installing the second version of the software program in the memory;
    computer readable program code configured to determine an availability of a difference tool at the software program or at an installer module;
    computer readable program code configured to, in response to a determination of an availability of a difference tool, determining from the difference tool according to a static comparison one or more differences between the at least one interface definition file of the first version and at least one interface definition file of the second version; and
    computer readable program code configured to generate a results file that displays the determined differences.

* * * * *